Figure 1:
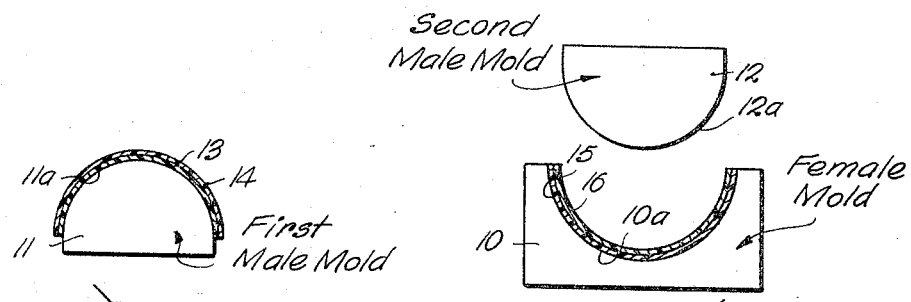

United States Patent Office 3,334,001
Patented Aug. 1, 1967

3,334,001
PROCESS FOR FORMING A LAMINATED
PLASTIC STRUCTURE
James G. Tyhurst, Raytown, Mo., assignor, by mesne assignments, to Certain-Teed Products Corporation, Ardmore, Pa., a corporation of Maryland
Filed June 3, 1963, Ser. No. 285,454
4 Claims. (Cl. 156—228)

This invention relates to improved methods and processes for forming laminated plastic structures and refers more particularly to methods and processes of low compression molding for forming laminated, fiber-reinforced plastic constructions.

This application is a continuation-in-part of my application Ser. No. 153,968, filed Nov. 21, 1961, "Process for Forming a Laminated Plastic Structure," now Patent No. 3,210,230 issued Oct. 5, 1965.

In my above-mentioned application Ser. No. 153,968, processes and methods of low compression molding to form laminated, fiber-reinforced plastic structures were disclosed. One variation of such processes consisted in the following steps: (1) applying a coating of fiber-free thermo-setting plastic resin in a fluid uncured state on the molding surface of at least one of a pair of molding members of a separable mold unit while the said mold unit was in the open separated condition, (2) then allowing the fiber-free coating on the mold member to at least partially cure, (3) applying a coating of fiber-reinforced thermo-setting plastic resin in a fluid uncured state on both mold members, (4) permitting the fiber-reinforced coatings on each of the mold members to at least partially cure, (5) applying a bonding coating of a thermo-setting plastic resin with or without fiber reinforcement in fluid-uncured state upon the partially cured fiber-reinforced coating on at least one of the mold members, (6) thereafter closing the mold unit to dispose the molding surfaces of each of the mold members in opposed relationship and applying slight compression to the mold members whereby to cause the bonding coating to flow over and completely coat the respective, partially cured fiber-reinforced coatings on each of the mold members, (7) allowing the bonding coating to cure with the finished article then being removed from the mold. Alternatively, an initial coating of fiber free thermo-setting plastic resin in the fluid uncured state was applicable to the molding surface of both of the said mold members.

An object of the instant invention is to provide new and improved methods and processes of low compression molding for producing laminated, fiber-reinforced plastic constructions which accomplish all of the objects set forth in my above-mentioned application Ser. No. 153,968.

Particularly with respect to larger scale final products produced by the processes disclosed in my application Ser. No. 153,968, supra, problems of handling the male portion of the mold with respect to the female portion thereof become of considerable magnitude. Thus, it is desirable to apply the gel coat and/or skin coat on the male mold when the latter is in convex upward position. In such case, it has proved difficult and cumbersome to lift the heavy male mold with the plastic laminate layup thereon, turn it over and then fit it into the female mold, which latter is preferably prepared in a concave upwards position.

Yet further, there arise problems of removal of or releasing the finished product from the male mold. As a polyester or epoxy resin cures, it shrinks and also develops a strong adhesion to any surface with which it is in contact. It is thus less difficult to remove a partially cured portion of the molding from the initial layup male mold than the fully cured entire molding after mating the mold parts because the former is more flexible and has not taken its full shrinkage. The shrinkage effect on the male mold also argues for use of a lesser dimension male mold member in the final mating stage.

Therefore, additional objects of the instant process and method lie in the provision of practical, advantageous and economical methods of molding fiber reinforced plastic products wherein it is desirable to apply the gel and/or skin coats to the male mold with the latter in convex upward position and where it is undesirable to lift the heavy male mold, turn it over and then combine it with the female mold.

Another object of the invention is to provide methods and processes of molding fiber-reinforced plastic products wherein a male and female mold assembly is employed and problems exist in respect to removal of the finished products from the male mold, such improved process and method reducing or removing such problems.

Another object of the invention is to provide methods and processes for molding laminated plastic structures wherein deep draw molding operations may be carried out with greater chances of optimum success and product fabrication.

Another object of the invention is to provide methods and processes for molding laminated plastic constructions wherein unusual control of the degree of finish and direction of shrinkage of the laminates and final product may be achieved, wherein considerable variance in wall thickness may be utilized as desired and wherein inserts may be molded in with ease as desired.

Another object of the invention is to provide such processes which meet and handle shrinkage problems common to the art more successfully than before.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

Applicant herewith incorporates the entire disclosure of his above-identified application Ser. No. 153,968, now Patent Number 3,210,230 issued Oct. 5, 1965, with respect to various technical details of methods and processes disclosed therein for forming laminated plastic structures. Thus, details with respect to the mold units themselves, mold release substances, fiber and binder mixtures, particular plastic substances usable in the processes, etc. will not be repeated where they are identical between the two disclosures. This incorporation without detailed repetition refers, additionally, to details of materials usable in the release coatings on the molds, the gel coating or coatings on one or more of the mold units, the skin coating or coatings used on one or more mold units and the bonding layer applied to one or more of the skin or gel coating on one or more mold units. Further, such incorporation includes details of spray gun devices usable for applying the skin and bonding coatings. Applicant further incorporates the disclosures of the examples of the said application with respect to details of materials and process steps of layup.

The instant improvements to the processes of said Ser. No. 153,968 comprise, first, the provision of a female mold, as seen at 10 in FIG. 1 having a mold cavity surface 10a typically concave upwardly. A first or layup male mold 11 is also provided having a convex upwardly molding surface 11a. A second of combining male mold 12 is present having a convex downwardly molding surface 12a. Mold 12 is positioned either above or so located with respect to the female mold 10 that it may be readily positioned above said female mold for lowering thereinto. Suitable conventional lifting and lowering means (not seen) are provided. Molding surface 12a is of substantially identical geometric configuration to that of molding surface 11a of first male mold 11 with substantially identical or preferably slightly less overall relative dimensions or size with respect thereto.

Turning to the process improvements, there is first provided in female mold 10, then, either one or more "gel" coatings of fiber-free thermo-setting plastic resin in the fluid uncured state on the molding surface 10a or one or more "skin" coatings of fiber-reinforced thermo-setting plastic resin in the fluid uncured state. Likewise, at substantially the same time, there is alternatively applied to first male mold 11 either one or more like "gel" coatings as described or one or more like "skin" coatings as described. After these operations, then both female mold 10 and first male mold 11 have at least one coating thereon (1) either both gel, (2) one gel (either) and the other skin or (3) both skin.

Figure 2:
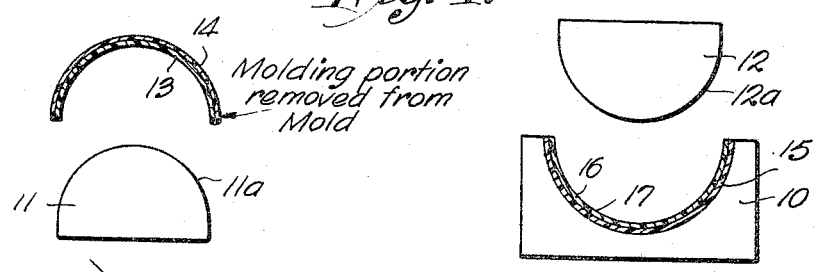

At this point, after each said gel or skin coating on each mold has at least partially cured, and, optionally, fully cured, one or more coatings of fiber-reinforced thermo-setting plastic resin is applied to either mold member of the pair which has not yet received such. Before full cure (but after sufficient cure to provide structural and dimensional integrity with or without considerable flexibility) of the layup (either skin layer or gel and skin layer) on the male mold 11, said layup is removed from the male mold molding surface 11a as seen in FIG. 2. As noted, this layup may be one or more skin layers or one or more gel coats plus one or more skins.

At this point or shortly before, one or more bonding coats consisting of thermo-setting plastic resin in fluid uncured state with or without fiber-reinforcement is applied to one or both of the said layups, preferably to the inside or concave upward face of the layup in the female mold, but optionally on the convex upward male mold layup alone or both. Thereafter, the two mold layups are combined or preliminarily mated "by hand" as in FIG. 3 with the former convex upward face of the first male mold layup lying or facing against and in opposition to the concave upward face of the layup on female mold 10. Various precise adjustments and fittings may be accomplished at this time due to the shrinkage of the male mold layup and/or its flexibility if the latter is present, including application of inserts of mat or the like. Thereafter, the second male mold 12 is brought down into molding or mating position as in FIG. 4 whereby to consolidate the molding layup assembly with molding face 12a abutting against the former concave downward portion of the first male mold layup.

After skin coatings have been applied to the respective gel or smooth coatings or prepared (by suitable parting agents) mold surfaces of each of the mold members, such fiber reinforced skin coatings are preferably rolled or otherwise compressed to remove air bubbles and the like. Once the mold members are in the position of FIG. 4, they are then subjected to slight compression and the bonding coating is allowed to cure. Thereafter, the laminate molded structure is removed from the mold members.

The layup from the first male mold may be inserted within the female mold either before or after complete polymerization thereof, at least partial polymerization required whereby to retain shape and dimensional integrity. When the complete molding product is separated from the second male mold, removal is relatively easy because of the material having been to some extent stretched by the insertion of the second male mold. Also, the fact that the material has partially cured before it comes into contact with the second male mold minimizes the adhesion.

Figure 3:
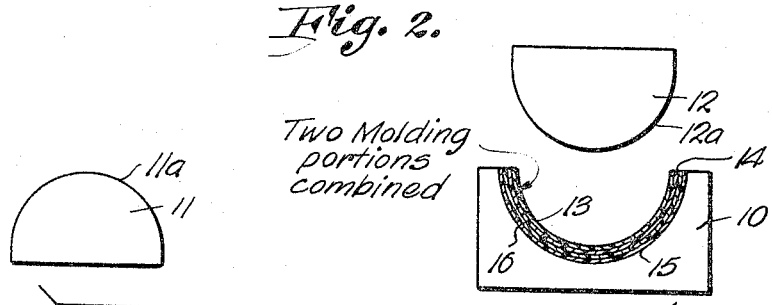
Figure 4:
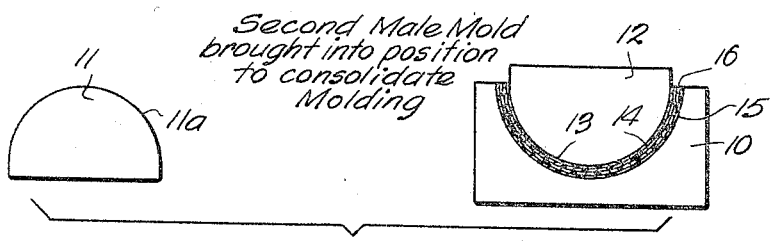

It is evident that the layup which is removed from the first male mold and inserted into the female mold as in FIG. 3 can only be placed in approximately its final position within the said female mold layup. The second male mold is required to be brought into position as seen in FIG. 4 whereby to force the two portions into the proper relationship.

The drawing shows a typical laminate construction involving a two-layer layup on the first male mold having a gel coat 13 overlaid by a skin coat 14. On female mold 10 the same layup is provided with gel layer or coat 15 and skin layer or coat 16. The end product thus has four layers, two outside gel layers and two inside skin layers, the latter fused between bonding coat 17 applied before the step of FIG. 3.

The following examples illustrate some methods of producing fiber reinforced laminated plastic structure according to my novel process. It is to be understood, however, that the invention is by no means limited to the specific methods described in the examples.

*Example I*

A fiber-free polyester, pigmented resin is sprayed while in the fluid or uncured state upon the mold surfaces 13 and 14 by means of a conventional spray gun. The polyester resin used in this smooth or gel coating may be any of the commercial pigmented brands such as, for example, "Glidpol" or "Arapol" as they are known in the trade which include a preselected pigment and a polyester filler resin. This smooth or gel coating is then allowed to polymerize or cure.

A fiber-reinforced skin coating S is then applied to each of the pigmented gel coatings and the skin coating is comprised of a polyester resin reinforced with fiber glass. The reinforcing fiber glass fibers are not less than ⅛ of an inch in length and preferably in the preferred embodiment approximately 1 inch in length. This skin coating S is preferably applied with an applicator gun and the fibers will be disposed in random fashion. The promoted resin may be any of the conventional polyester resins, promoted by adding dimethyl aniline or diethyl aniline. The catalyzed resin may be any of the conventional polyester resins, catalyzed by adding benzoyl peroxide.

The skin coating S is applied preferably by spray to the smooth or gel coating S and on both the mold members and are then allowed to cure until the resin is sufficiently polymerized. The skin coating is then removed from the first male mold and either held in storage as long as desired or incorporated into the female fold as previously described after the application of the bonding coating. The bonding coating is applied which also comprises a fiber glass reinforced polyester bonding resin and is preferably applied with an applicator gun and includes a promoted resin and catalyzed resin ratio as in the skin coating. This bonding coating is applied to the cured skin coating on only one of the mold members and the mold unit is then closed so that the mold members are in opposed relationship. The mold, assuming it is of a relatively shallow draft, is then subjected to slight compression of approximately 1½ to 2 p.s.i. and greater if of greater draft, thus causing a bonding coating to flow evenly throughout the surface areas of the skin coating and this bonding coating is then allowed to cure. The temperature may be elevated to accelerate curing of the bonding coating.

Example II

A fiber-free epoxy resin having a molded in pigment is applied to either or both of the respective molding surfaces 13 and 14 of the mold members 11 and 12 and allowed to cure at room temperature. These fiber-free coatings on the mold member comprise the smooth or gel coatings. Thereafter, skin coatings comprised of fiber glass reinforced epoxy resin are sprayed upon the respective polymerized smooth or gel coatings or prepared mold surface on each of the mold members in the manner of Example I. The fiber glass reinforced epoxy skin coatings are also applied with a resin and fiber glass applicator gun wherein conventional epoxy hardener and resins are mixed and applied to the chopped fibers. These fiber glass reinforced skin coatings are then preferably compressed as by rolling to remove the air bubbles and are then allowed to cure at room temperature. After at least partial cure of the layup on the first male mold, it is removed therefrom and either passed to storage or mated wtih the layup of the female mold after application of a bonding coating to one or both of the layups.

A bonding coating, also comprised of a fiber glass reinforced epoxy resin is applied preferably by an applicator gun to the polymerized skin coating on one of the mold members. The mold members are then placed together closing the mold unit, while the fiber-reinforced bonding coating is in the uncured state and the mold unit being subjected to slight compression, typically of approximately 1½ to 2 p.s.i. in a shallow draft mold. The temperature may be raised to between 130° and 150° F., and the bonding coating is then allowed to polymerize or cure.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The process of low compression molding for forming a laminated, fiber-reinforced plastic structure, which process consists in,
   applying a coating of fiber-free thermo-setting plastic resin in the fluid uncured state to the molding surface of a concave upwardly female mold of a pair of mold members of a separable mold unit while the mold unit is in the open separated condition,
   allowing the fiber-free coating on the said female mold to at least partially cure,
   applying a coating of fiber-reinforced thermo-setting plastic resin in the fluid uncured state on top of the said female mold molding surface and the fiber free coating thereon,
   applying a coating of fiber-reinforced thermo-setting plastic resin in the fluid uncured state on the molding surface of an upwardly convex first male mold,
   allowing the fiber-reinforced coating on said first male mold to at least but only partially cure,
   removing the only partially cured fiber-reinforced coating from the first male mold member,
   applying a bonding coating of fiber-free thermo-setting plastic in the fluid uncured state to one of the convex upward portion of the male mold layup and the concave upward surface of the female mold layup surface,
   preliminarily mating the fiber-reinforced first male mold layup by hand with the female mold layup in the female mold with the bonding coat therebetween,
   adjusting and fitting the mold free male layup with the mold received female layup,
   closing a second convex downward male mold member of like configuration to the molding surface configuration of the first male mold but of lesser overall dimension than the latter into the female mold,
   whereby to dispose the molding surfaces of the second male mold and the first female mold in opposed full mating relationship and applying slight compression to the said mold members to cause the fiber-reinforced coating to fuse with the other said coating,
   and thereafter allowing said coatings to cure.

2. The process of low compression molding for forming a laminated, fiber-reinforced plastic structure, which process consists in,
   applying a coating of thermo-setting plastic resin in the fluid uncured state on the molding surfaces of an upwardly convex first male mold member and an upwardly concave female mold member, said coatings being fiber-reinforced,
   allowing the fiber reinforced coatings on each of the mold members to at least partially cure, but not completely cure,
   removing the only partially cured fiber-reinforced coating from the said first male member,
   applying a coating of fiber-free thermo-setting plastic resin in the fluid uncured state to one of the upwardly concave surface of the female mold layup or the upwardly convex surface of the first male mold layup,
   preliminarily mating the first male mold layup with the female mold layup by hand in the female mold,
   adjusting and fitting the mold free male layup with the mold received female layup,
   closing a second convex downward male mold member of like molding surface configuration to the said first male mold member but of lesser overall dimension into said first female mold to dispose the molding surfaces of each of said mold members in opposed full mating relationship,
   applying slight compression to the mold members to cause the fiber-reinforced coatings on each of the mold members to fuse,
   and thereafter allowing said coatings to cure.

3. A process as in claim 2 wherein the fiber-reinforced coating on the first male mold layup is first cured before insertion into the female mold.

4. The process of low compression molding for forming a laminated, fiber-reinforced plastic structure, which process consists in,
   applying a coating of fiber-free thermo-setting plastic resin in the fluid uncured state to the molding surface of each of a pair of mold members of a separable mold unit while the mold unit is in the open separated condition,
   the mold members comprising an upwardly convex first male mold member and an upwardly concave female mold member,
   allowing the fiber-free coating on the respective mold members to at least partially cure,
   applying a coating of fiber-reinforced thermo-setting plastic resin in the fluid uncured state on the fiber-free coating of said male mold member and said female mold member,
   allowing the fiber-reinforced coating on said male mold member to at least partially cure, but not completely cure, removing the layup from the said male mold member, applying a coating of fiber-reinforced thermo-setting plastic resin in the fluid uncured state to one of the surfaces to be mated of either the first male mold removed layup or the female mold in place layup, preliminarily mating the said male mold layup with the said female mold layup by hand in the female mold, adjusting and fitting the mold free male layup with the mold received female layup, moving a second convex downward male mold member into said female mold member whereby to dispose the molding surfaces of each of same in opposed full mating relationship, said second male mold member having a like configuration but lesser overall dimension than that of the said first male mold, and applying slight compression on the mold members to cause the coatings on each of the mold members to fuse, and thereafter allowing said fiber-reinforced coatings to cure.

References Cited

UNITED STATES PATENTS

| | | | |
|---|---|---|---|
| 2,049,878 | 8/1936 | Stresino | 161—205 |
| 2,613,397 | 10/1952 | Borkland | 156—224 X |
| 2,688,580 | 9/1954 | Fingerhut | 161—156 X |
| 3,101,994 | 8/1963 | Hartmann | 264—247 |
| 3,140,325 | 7/1964 | Graff | 156—224 X |

FOREIGN PATENTS

| | | |
|---|---|---|
| 1,174,216 | 3/1959 | France. |

EARL M. BERGERT, *Primary Examiner.*

H. F. EPSTEIN, *Assistant Examiner.*